United States Patent [19]

Sager

[11] 4,029,423
[45] June 14, 1977

[54] FREE-WHEELING SPINDLE ADAPTOR

[76] Inventor: Fred A. Sager, 42 Blackburn P., Ventura, Calif. 93003

[22] Filed: Nov. 24, 1975

[21] Appl. No.: 634,494

[52] U.S. Cl. .................................. 403/3; 301/111; 301/132
[51] Int. Cl.² .................. B60B 27/02; B60B 27/06
[58] Field of Search .......... 403/1, 3; 301/1, 105 R, 301/128, 111, 132; 192/50

[56] References Cited

UNITED STATES PATENTS

| 2,609,243 | 9/1952 | Ponnequin | 403/1 |
| 2,874,814 | 2/1959 | Beck | 403/1 |
| 3,351,364 | 11/1967 | Warn et al. | 403/1 |
| 3,442,361 | 5/1969 | Hegar | 403/1 X |
| 3,532,384 | 10/1970 | Williams, Jr. | 301/128 X |

Primary Examiner—Allan D. Herrmann
Attorney, Agent, or Firm—Lyon & Lyon

[57] ABSTRACT

An adaptor capable of being mounted to the drive hubs of a vehicle to allow the vehicle to roll freely without rotation of the drive hubs or drive train. The adaptor includes an adaptor spindle which can be directly mounted to the drive hub using the wheel studs. A free-wheeling hub is mounted onto the adaptor spindle and includes a stud flange and studs providing an identical attachment pattern to that of the drive hub. The wheel of the vehicle may therefore be mounted on the free-wheeling hub such that the vehicle may be towed without injury to the drive line.

7 Claims, 3 Drawing Figures

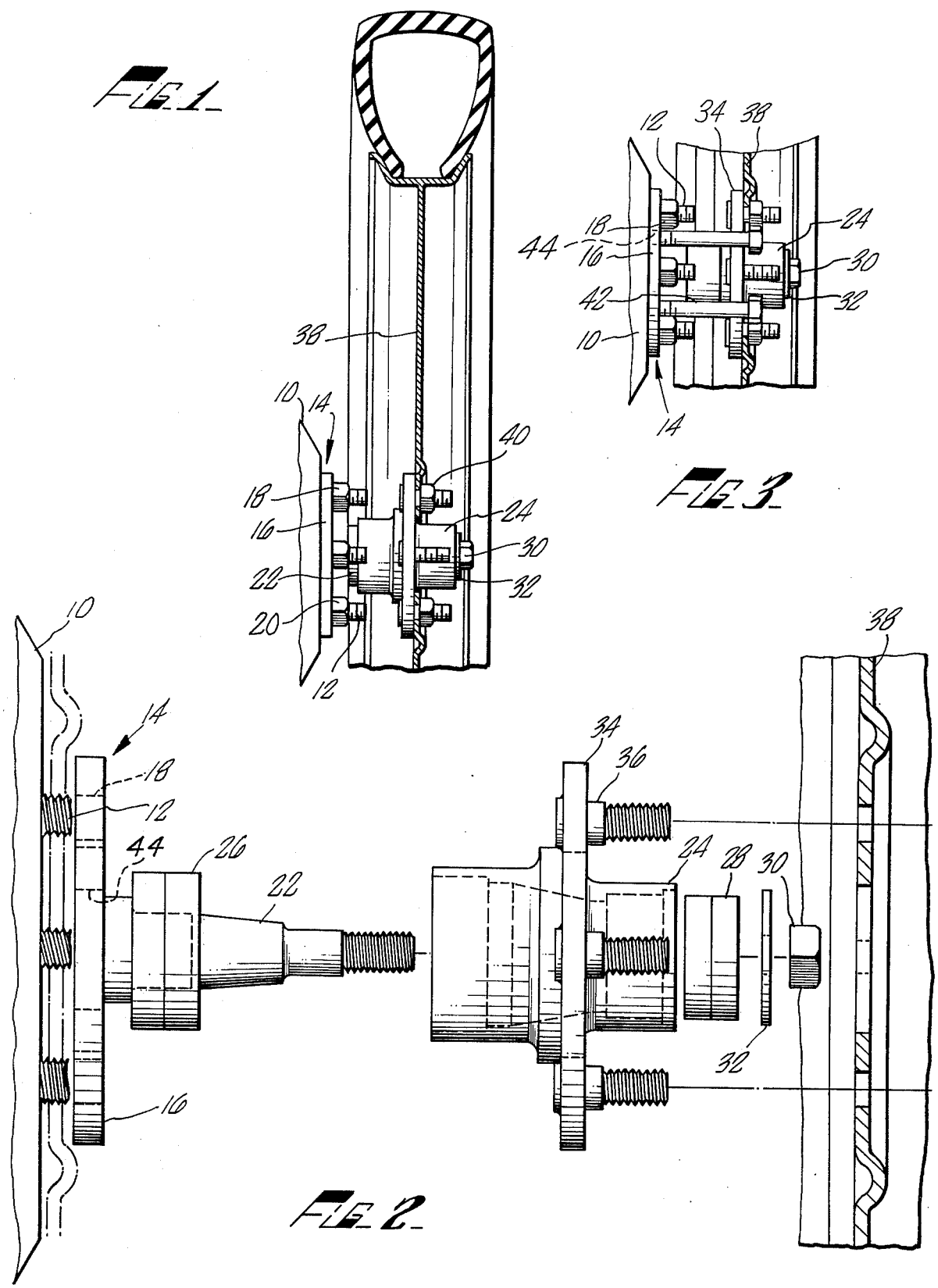

FREE-WHEELING SPINDLE ADAPTOR

BACKGROUND OF THE INVENTION

The present invention is directed to automotive vehicles. More specifically, the present invention is directed to an adaptor spindle and hub arrangement allowing free-wheeling of the drive wheel of a vehicle.

It has long been a common practice to tow recreational vehicles and disabled vehicles significant distances behind another vehicle. More recently, the towing of jeeps and the like behind recreational vehicles has beome commonplace. However, the towing of such vehicles with the drive line connected to the drive wheels is not recommended because of possible damage to the transmission and other drive line components of the vehicle. As a result, it has been common practice to disengage the drive shaft so that only the differential is driven by the motion of the vehicle. Other systems have also been employed to raise the vehicle off of its drive wheels onto some other rolling means for towing.

The known solutions to the problem of preventing injury to the drive line of a towed vehicle have generally been inconvenient or impossible to perform, require substantial additional gear or require some technical skill. As a result, the employment of recreational vehicles which are most conveniently towed to a recreation area has been curtailed and made more inconvenient because of the potential damage to the vehicle's drive line.

SUMMARY OF THE INVENTION

The present invention is directed to an adaptor spindle and hub capable of being positioned on a drive hub of a vehicle such that a wheel mounted on the adaptor hub will free wheel. An adaptor spindle is employed which is capable of mating with the studs on a drive hub. The adaptor spindle extends to receive a free-wheeling hub rotatably fixed to freely rotate on the adaptor spindle. The free-wheeling hub includes a stud flange and studs having an identical attachment pattern to that of the drive hub such that the wheel initially associated with the drive hub may be remounted on the free-wheeling hub.

By the present invention, the normal wheels of the vehicle may be employed during towing while the drive line is disconnected from the wheels. The present invention is as easily employed as changing a tire, does not require any significant technical skill, does not require climbing under the vehicle and does not require jacking the vehicle on some other wheel carrier system. Thus, towing of a vehicle for long distances may be easily accomplished with the present invention without experiencing damage to the drive line.

Accordingly, it is an object of the present invention to provide a means for towing a vehicle with the drive wheels in a free-wheeling condition.

It is another object of the present invention to provide an adaptor for a drive hub of a vehicle to allow the drive wheels to rotate in a free-wheeling condition.

It is further object of the present invention to provide a means for temporarily locking a free-wheeling drive wheel to the drive hub.

Other and further objects and advantages will appear hereinafter.

BRIEF DESCRIPTION OF THE DRAWINGS

FIG. 1 is a side elevation of the present invention assembled with a vehicle showing a wheel in partial section for clarity.

FIG. 2 is an exploded assembly view of the present invention.

FIG. 3 is a side elevation of the present invention with the temporary locking means in place.

DETAILED DESCRIPTION OF THE PREFERRED EMBODIMENT

Turning in detail to the drawings, a brake drum 10 is shown with studs 12 from the drive hub extending outwardly therethrough. Conventionally, a wheel is juxtaposed with the drum 10 and lug nuts cooperating with the studs 12 hold the wheel in position. Employing the present invention with the vehicle to be towed. The lug nuts and wheel are removed and momentarily set aside. The lug nuts and wheel will be employed again with the present invention.

Once the wheel has been removed, an adaptor spindle, generally designated 14 is positioned on the studs 12. The adaptor spindle 14 includes an adaptor plate 16 having holes 18 located therethrough in a pattern designed to accommodate the studs 12. Once positioned, the adaptor plate 16 may be held to the brake drum 10 on the drive hub by means of lug nuts 20 which may be tightened onto to studs 12. The lug nuts 20 may be the vehicle lug nuts which originally held the wheel in place. The adaptor spindle 14 further includes a spindle shaft 22. The spindle shaft 22 extends substantially perpendicularly from the adaptor plate 16 and is aligned with the drive hub such that the drive hub and the spindle shaft 22 extend along a common axis. The spindle shaft 22 is of conventional design commonly employed on many vehicles as the undriven front spindle.

A free-wheeling hub 24 is positioned on the spindle shaft 22. The free-wheeling hub 24 is also of conventional design generally employed on non-driven wheels. Bearings 26 and 28 rotatably mount the free-wheeling hub 24 on the spindle shaft 22. A nut 30 and washer 32 hold the hub 24 on the spindle shaft 22.

The hub 24 further includes a stud flange 34 which extends radially outwardly from the hub 24 to locate studs 36. The studs 36 extend outwardly away from the drive hub and are positioned in substantially the same attachment pattern as the studs 12 such that the same vehicle wheel 38 originally positioned on studs 12 may be positioned on studs 36. A second set of lug nuts 40 may then be used to fasten the wheel 38 about the free-wheeling hub 24. The stud flange 34 is spaced from the adaptor plate 16 so that the lug nuts 20 may be easily positioned on studs 12 without interference from the stud flange 34.

To avoid the complete removal of the present system for limited maneuvers requiring the self-propulsion of the vehicle, it may be advantageous to momentarily lock the free-wheeling hub 24 to the drive hub as shown in FIG. 3. Long bolts 42 are positioned through holes in the stud flange 34. These bolts 42 extend to the adaptor plate 16 to mate with threaded holes 44 extending therethrough. Several bolts 42 may be employed about the hub 24 to insure a rigid coupling between the free-wheeling hub 24 and the adaptor plate 16 which is constrained to rotate with the drive hub.

Thus, a system for conveniently and easily providing a free-wheel condition to drive wheels for the towing of a vehicle is disclosed. Means for temporarily locking such a system is also shown. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A free-wheeling adaptor fitting to a drive hub, comprising
   an adaptor spindle including a spindle shaft and an adaptor plate, said adaptor plate having the capacity for being attached directly to the drive hub such that said spindle shaft is aligned with the drive hub;
   a free-wheeling hub rotatably mounted on said adaptor spindle for free-wheeling motion, said free-wheeling hub having a wheel attachment pattern substantially the same as on the drive hub.

2. The adaptor of claim 1 wherein said free-wheeling hub is rotatably mounted on said adaptor spindle by automotive wheel bearings.

3. The adaptor of claim 1 wherein said free-wheeling hub includes a stud flange having studs extending away from said adaptor plate in said wheel attachment pattern.

4. The adaptor of claim 3 wherein said stud flange is spaced from said adaptor plate to allow attachment of said adaptor plate to the drive hub without disassembly of said adaptor spindle from said free-wheeling hub.

5. The adaptor of claim 1 further comprising locking means for locking said free-wheeling hub to the drive hub.

6. The adaptor of claim 5 wherein said locking means includes bolts positioned through said free-wheeling hub and extending to be rigidly fixed to said adaptor plate.

7. A free-wheeling adaptor fitting to a drive hub on a vehicle to allow rolling of the vehicle without rotation of the drive hub, comprising
   an adaptor spindle including an adaptor plate having holes therethrough for mating with studs on the drive hub and a spindle shaft extending perpendicularly from said adaptor plate in alignment with the drive hub;
   a free-wheeling hub rotatably mounted on said spindle shaft for free-wheeling motion and including a stud flange extending radially from said hub and studs positioned in said stud flange, extending away from said adaptor plate in a wheel attachment pattern substantially the same as on the drive hub to receive a wheel of the vehicle.

* * * * *